United States Patent [19]

Van et al.

[11] Patent Number: 5,088,086
[45] Date of Patent: Feb. 11, 1992

[54] OPTICAL RECORDING MEDIUM AND THE METHOD OF RECORDING, READING, AND ERASING INFORMATION USING IT

[75] Inventors: Kazuo Van; Hiroyuki Katayama; Akira Takahashi; Kenji Ohta, all of Nara, Japan

[73] Assignee: Sharp Kabushiki Kaisha, Osaka, Japan

[21] Appl. No.: 385,444

[22] Filed: Jul. 27, 1989

[30] Foreign Application Priority Data

Aug. 5, 1988 [JP] Japan ................... 63-196372

[51] Int. Cl.$^5$ ................................ G11B 7/00
[52] U.S. Cl. .................... 369/100; 369/284; 369/286; 430/945; 430/495; 365/106
[58] Field of Search .............. 369/108, 275.2, 288, 369/286, 284, 100; 365/102–109; 430/945, 495

[56] References Cited

U.S. PATENT DOCUMENTS

| | | | |
|---|---|---|---|
| 3,720,921 | 3/1973 | Schools et al. | 365/119 X |
| 4,789,965 | 12/1988 | Michl et al. | 365/121 X |
| 4,837,063 | 6/1989 | Irie et al. | 369/288 X |
| 4,845,021 | 7/1989 | Miyazaki et al. | 430/495 |
| 4,864,537 | 9/1989 | Michl et al. | 365/121 X |

FOREIGN PATENT DOCUMENTS 0193931 9/1986 European Pat. Off. .
62-165751 7/1987 Japan .
62-287246 12/1987 Japan .

OTHER PUBLICATIONS

Kampf, "Optische Datenspeicher . . . ", 1155 Technische Rundschau, 79 (1987), 26 Jun., No. 26, pp. 70–77.

Primary Examiner—Robert L. Richardson
Attorney, Agent, or Firm—Birch, Stewart Kolasch & Birch

[57] ABSTRACT

The invention provides an optical recording medium and a method of recording, reading, and erasing information to an optical recording medium, where information is recorded, read, and erased to the recording medium by applying beams projected from a light source capable of varying wavelength of beams. The recording medium contains at least two kinds of organic compounds each presenting photochromic phenomenon and being dispersed in binder. By projecting beams onto the optical recording medium, recording, reading, and erasure of information making use of a photochromic phenomenon can be executed independently against each organic compound dispersed in the recording medium. As a result, the optical recording medium promotes to increase the information recording density in proportion to the number of the kind of organic compounds.

18 Claims, 3 Drawing Sheets

OPTICAL RECORDING MEDIUM AND THE METHOD OF RECORDING, READING, AND ERASING INFORMATION USING IT

FIELD OF THE INVENTION

The present invention relates to an optical recording medium by which information is recorded, read and erased by applying laser beams and, for example, making use of the photochromic phenomenon and the method there of.

BACKGROUND OF THE INVENTION

Recently, as a result of the achievement of high density and large capacity in optical recording media, the demand for optical recording media tends to significantly grow year by year. Conventionally, the optical recording medium is classified into three types according to the type of use including the type which is solely used for reading, the type which allows additional recording (write once-type), and the type which allows rewriting of information, respectively.

Of these, the write once-type optical recording medium records information by applying such processes consisting essentially of the projection of laser beams onto the recording medium of the optical recording medium and the occurrence of fusion or decomposition of the beam-projected spot for providing geometric pits in the beam-projected recording medium.

Besides the above example, information can also be recorded in the write once-type optical recording medium by applying those processes consisting essentially of the projection of laser beams onto the recording medium of the optical recording medium and the variation of optical characteristics like the index of reflection of the beam-projected portion by crystalizing or forming a non-crystalline condition in the beam-projected portion so that information can be recorded.

Conventionally, there is such a rewritable optical recording medium in which information is recorded making use of a magneto-optial effect or a phase transition of the recording medium. Information is recorded by using the optical recording medium applying a magneto-optical effect by sequentially executing those processes described below. First, laser beams are projected onto a recording medium containing films which are magnetized in a direction perpendicular to the surface of the recording medium. Next, by applying a magnetic field from an external source, the magnetized direction of the magnetized portion is inverted from that of the portion in which is not exposed to the projection of beams in the condition where the beam-projected portion is heated above the Curie temperature, thus allowing the rewritable optical recording medium to be recorded information.

While information is recorded by using the optical recording medium applying a phase transition by executing those processes described below.

First, laser beams are projected onto the recording medium, and then, a phase of the beam-projected portion of the recording medium is converted into a crystalline condition from the non-crystalline condition or vice versa, thereby recording information in the optical recording medium. Note that any of those methods mentioned above for recording information in the optical recording medium use laser beams as a heating source, and thus, these processes can be summarized as "heat-mode" recording systems.

Recently, independent of the "heat-mode" recording system, research and development of such an optical recording medium using the "photon-mode" recording system has been conducted. As a typical example of the "photon-mode" recording system, such a system using organic compounds presenting photochromic phenomenon is conventionally known. For example, as was disclosed by the Japanese Laid-Open Patent Publication No. 62-165751 (1987), information is recorded on the multiplex basis according to the wavelength dimensions and the polarization-degree dimensions on a recording spot of laser beams by initially writing information in a cumulative film of a cumulated plurality of monomolecular films containing organic coloring matter on recording medium by projecting beams having different wavelengths or degree of polarization, followed by varying either the wavelengths or the degree of polarization of the laser beams used for recording.

The photochromic phenomenon is the phenomenon in which a certain solid or liquid material reversibly varies in color by projecting a light. There are a wide variety of organic compounds which exhibit the a photochromic phenomenon such as hydrazone, osazone, stilbene, salicylaldehyde, spiropyrane, fulgide, azobenzene, and derivatives of these, for example. Out of these organic compounds, a typical example of an optical recording medium using a well-known recording medium composed of fulgide is described below. By projection of ultraviolet rays having a wavelength of about 340 nm and visible rays, fulgide alternately causes intramolecular ring closure as shown in FIG. 3 ($b$) and intramolecular ring opening as shown in FIG. 3 ($a$). As a result, as is well known, variation of the absorption spectrum shown by the solid line and the assumptive line in FIG. 4 reversibly occurs.

For example, the absorption spectrum shown by solid line in FIG. 4 is initially caused by preliminarily projecting visible rays onto fulgide, followed by execution of the recording by projecting recording beams having a wavelength of about 340 nm thereon. The portion exposed to the projection of the recording beam varies into the state indicated by the absorption spectrum shown by the assumptive line in FIG. 4. As a result, for example, when this portion is subjected to the projection of weak beams having a wavelength of about 350 nm close to the wavelength of the recording beam, a certain difference in absorbance shown by $\Delta T$ in FIG. 4 is produced between the portion subjected to the projection of the recording beam and the portion free from the beam projection, and thus, based on the difference in absorbance, a recorded signal can be read.

On the other hand, in order to erase the recorded signal, the absorption spectrum shown by solid line I in FIG. 4 restores itself as a result of the projection of beams having a wavelength of about 500 nm onto the portion subjected to the projection of the recording beam. As mentioned above, since the photochromic phenomenon is reversibly presented, the recording medium can be used for an erasable optical recording medium.

In the manner mentioned above, recording information in the optical recording medium making use of a photochromic phenomenon is implemented by projecting laser beams onto the recording medium. On the other hand, the spot diameter of beams focused by the optical lens is constrained by the diffraction, where the spot diameter is confined to the scope of the wavelength. Actually, the spot diameter of visible rays or near-infrared rays is confined to about one micron. When executing digital recording of one-bit information in the beam-spot region, any of those conventional optical recording media is merely provided with a maximum of $10^8$ bit/cm$^2$ of recording density, and as a result, sufficient recording density cannot be provided for any conventional optical recording medium.

In order to more densely record information using a photon-mode recording system, recently, research and development of newer optical recording media making use of a photochemical hole burning phenomenon are underway. Nevertheless, actually, there are still a variety of technical problems to solve before offering them for practical use.

SUMMARY OF THE INVENTION

It is an object of the invention to provide an optical recording medium in which at least two kinds of organic compounds each showing photochromic phenomenon are dispersed in a binder so that information can be independently recorded, read and erased by the optical recording medium making use of the photochromic phenomenon of each organic compound.

Another object of the invention is to provide an optical recording medium by which an information recording density can be increased in proportion to the number of kinds of organic compounds used.

A still further object of the invention is to provide a method of recording, reading, and erasing information using the aforementioned optical recording medium.

To achieve these objects mentioned above, an optical recording medium by which information is recorded, read, and erased to a recording medium by applying beams projected from a light source capable of varying wavelength, wherein the recording medium comprises at least two kinds of organic compounds individually exhibiting the photochromic phenomenon being dispersed in a binder.

The aforementioned optical recording medium may include a substrate made of glass or plastic or a like material and a recording medium formed on the substrate.

The optical recording medium mentioned above may include at least two kinds of organic compounds such as hydrazone, osazone, stilbene, salicylaldehyde, spiropyrane, fulgide, azobenzene, and derivatives of these, being dispersed in the binder.

The above optical recording medium may include thioindigo and pyrene thioindigo being dispersed in the binder.

The binder mentioned above may maintain at least two kinds of organic compounds in a dispersed condition and may include an optically transparent material.

The above binder may be made of acrylic polymer, or polyvinyl chloride polymer, or an inorganic compound such as water glass.

The organic compound mentioned above may have a color which is reversibly variable by a projection of a beam from a light source which is capable of projecting beams having different wavelengths.

The above organic compound may have an absorption spectrum which is reversibly and significantly variable by a projection of beams from the light source which is capable of projecting beams having different wavelengths.

The substrate mentioned above may comprise a geometric pattern such as grooves etc. on the surface thereof.

The above recording medium may be formed with a reflection film on the top surface thereof.

The above recording medium may comprise protective films by which the recording medium is disposed therebetween, whereby the recording medium can be protected from high temperature and humidity.

A method of recording, reading, and erasing information to the optical recording medium mentioned above comprises the steps of:

an initial step for producing the first absorption spectrum by projection of beams having such a wavelength corresponding to a point close to the peak of the second absorption spectrum of the organic compounds, each exhibiting a photochromic phenomenon, in which the first and second absorption spectra reversibly vary by exposure to the projection of beams having different wavelengths;

a recording step for recording information in the recording medium by projection of the recording beams having a wavelength corresponding to a point close to the peak of the first absorption spectrum of the recording medium;

a reading step for reading information from the recording medium by the detection of the difference in absorbance between the absorption spectra before and after recording with recording beams by projecting beams having such a wavelength corresponding to a point close to the recording beam and a lower intensity than that of the recording beams; and an erasing step for erasing the recorded information by projecting a beam having such a wavelength corresponding to a point close to the peak of the second absorption spectrum onto the recording medium, followed by varying the second absorption spectrum of the recorded portion into the first absorption spectrum so that the condition of the recording medium is in an initial state.

BRIEF DESCRIPTION OF THE DRAWINGS

FIGS. 1 and 2 respectively show an embodiment of the present invention wherein;

FIG. 1 (a) is a graphical chart illustrating an absorption spectrum of organic compound A in a recording medium of an optical recording medium;

FIG. 1 (b) is a graphical chart illustrating an absorption spectrum of organic compound B in a recording medium of an optical recording medium;

FIGS. 1 (c and d) are graphical charts illustrating whole absorption spectra in a recording medium of an optical recording medium; and FIG. 2 is a partly diagrammatic longitudinal sectional view of an optical recording medium.

FIGS. 3 and 4 respectively show a recording medium of a conventional optical recording medium wherein;

FIG. 3 (a) is a structural formula illustrating a condition of ring open of fulgide used for component of a recording medium of a conventional optical recording medium;

FIG. 3 (b) is a structural formula illustrating a condition of ring closure of fulgide used for component of a recording medium of a conventional optical recording medium; and FIG. 4 is a graphical chart illustrating a variation of the absorption spectrum produced by fulgide used for component of a recording medium shown in FIGS. 3 (a) and (b).

DESCRIPTION OF THE EMBODIMENTS

Figure 1:
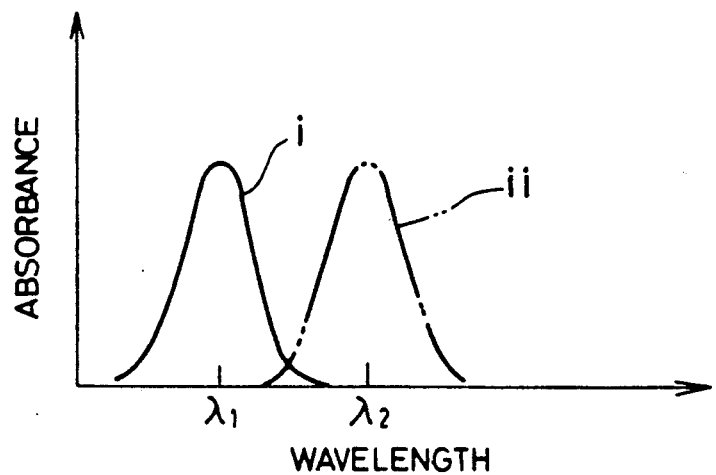
Figure 1:
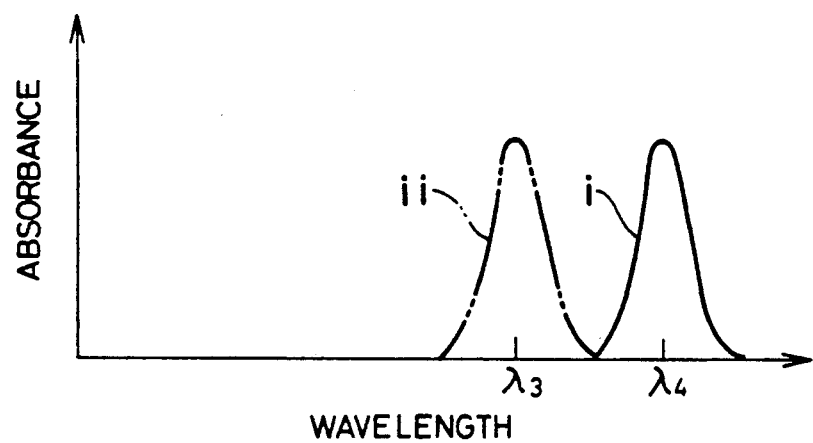
Figure 1:
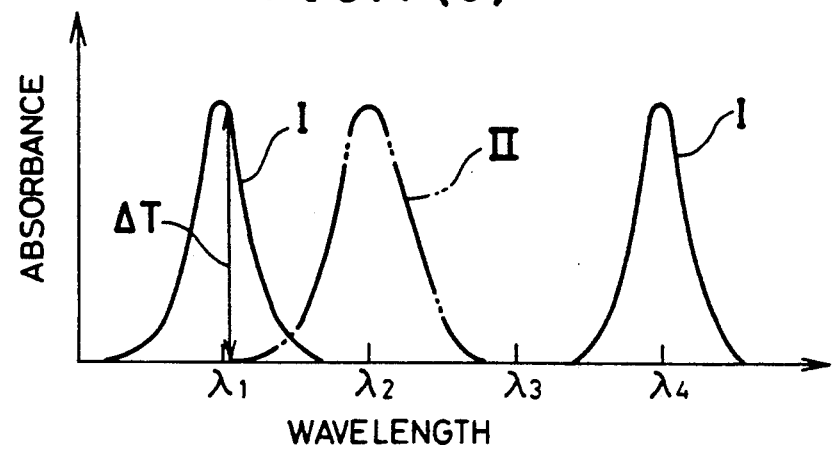
Figure 1D:
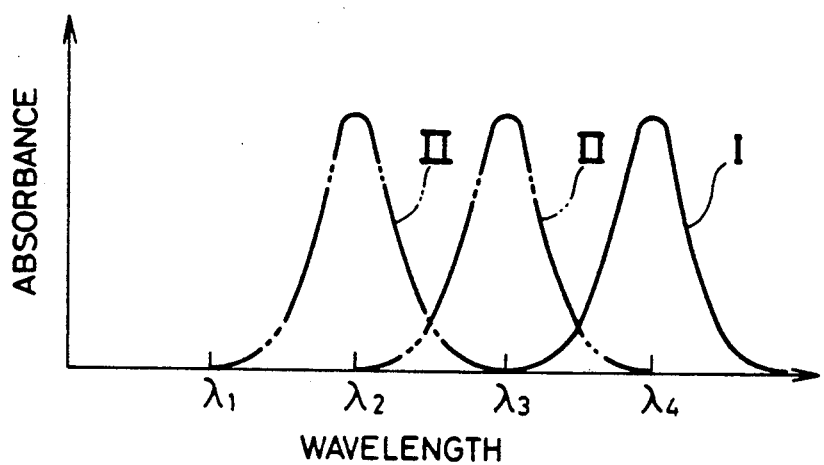
Figure 2:
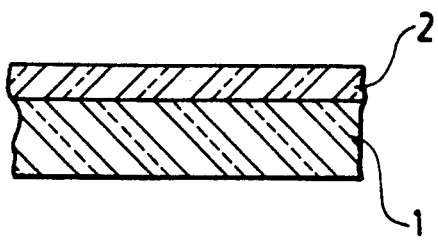
Figure 3A:
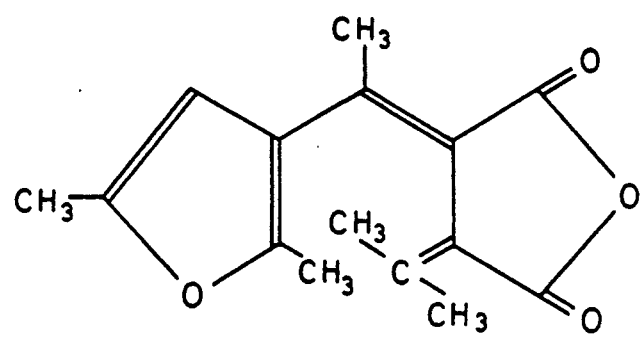
Figure 3B:
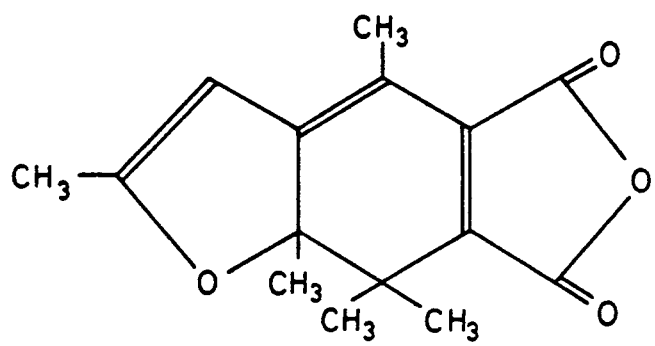
Figure 4:
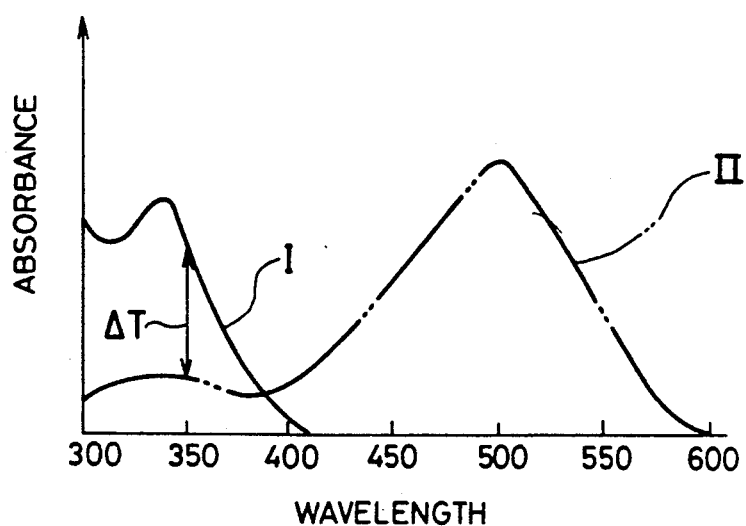

Referring now to FIGS. 1 and 2, an embodiment of an optical recording medium according to the present invention will be explained hereinbelow.

As shown in FIG. 2, an optical recording medium is composed of a substrate 1 made of glass or plastic or the like and a recording medium 2 formed on the substrate 1. The recording medium 2 has a composition in which at least two kinds of a variety of organic compounds exhibiting a photochromic phenomenon such as hydrazone, osazone, stilbene, salicylaldehyde, spiropyrane, fulgide, azobenzene, and derivatives of these, are dispersed in a binder.

The binder can maintain at least two kinds of organic compounds in a dispersed condition, and yet, a binder which is optically transparent is acceptable for use. For example, acrylic polymer or polyvinyl chloride polymer, or an inorganic material such as water glass may also be used for the binder.

The following description refers to the case in which the recording medium 2 contains two kinds of organic compounds A and B each exhibiting a photochromic phenomenon in the condition wherein these compounds are dispersed in the binder, for example.

The example will be described under the following condition. That is, as shown in FIG. 1 (a), organic compound A exhibits a photochromic phenomenon upon exposure to beams having wavelengths $\lambda 1$ and $\lambda 2$, wherein the absorption spectrum thereof reversibly varies between the condition indicated by the solid line i and the other condition indicated by the assumptive line ii. On the other hand, as shown in FIG. 1 (b), organic compound B exhibits a photochromic phenomenon upon exposure to beams having wavelengths $\lambda 3$ and $\lambda 4$, wherein the absorption spectrum thereof reversibly varies between the conditions indicated by the solid line i and the assumptive line ii. The embodiment adopts such organic compounds A and B which respectively have the recording and erasing wavelengths $\lambda 1$ through $\lambda 4$ used for recording and erasing information on and from those organic, compounds A and B, wherein each wavelength satisfies the relationship $\lambda 1 < \lambda 2 < \lambda 3 < \lambda 4$ therebetween.

In order to record information in the recording medium 2, first, the recording medium 2 is exposed to the sequential projection of beams having wavelengths $\lambda 2$ and $\lambda 3$ during an initial stage, and then the absorption spectrum indicated by the solid line I in FIG. 1 (c) is preserved in the recording medium 2.

Then, when projecting a recording beam having wavelength $\lambda 1$ onto the recording medium 2, only a photochemical reaction with regard to the organic compound A in the recording medium 2 takes place, and then the absorption spectrum of the organic compound A varies into that shown by the assumptive line II in FIG. 1 (c). When projecting a beam having a lower intensity than that of the recording beam and a wavelength close to $\lambda 1$ in the above condition, there occurs, the difference in absorbance $\Delta T$ between the absorption spectra before and after the recording with the recording beam having a wavelength $\lambda 1$, whereby recording information using wavelength $\lambda 1$ can be detected.

Next, when projecting a recording beam having wavelength $\lambda 4$ onto the recording medium 2 in the condition where the organic compound A has the absorption spectrum shown by the assumptive line II in FIG. 1 (c), only a photochemical reaction with regard to the organic compound B takes place, and then the absorption spectrum of the organic compound B varies into that shown by the assumptive line II in FIG. 1 (d). When projecting a beam having lower intensity than that of the recording beam and wavelength close to $\lambda 4$ in the above condition, there occurs, the difference in absorbance between the absorption spectra before and after the recording with the recording beam having wavelength $\lambda 4$, whereby recording information using wavelength $\lambda 4$ can be detected. In this way, recordings with wavelengths $\lambda 1$ and $\lambda 4$ are independently executed without adversely affecting the content of the previous recordings done at other wavelengths.

For example, in order to erase information recorded by the recording beam having wavelength $\lambda 1$ in the condition where the organic compound A has the absorption spectrum shown by the assumptive line II, when a beam having wavelength $\lambda 2$ is projected onto the recording medium 2, the absorption spectrum returns to the condition shown by the solid line I. In this way, irrespective of the previous recording done by applying other wavelengths, additional recording using wavelengths $\lambda 1$ and $\lambda 4$ can be respectively executed independently. Furthermore, erasure of the recorded information by applying respective wavelengths $\lambda 1$ and $\lambda 4$ can be executed independently without adversely affecting the content of information recorded by applying other wavelengths. Accordingly, the optical recording medium according to the present invention provides information recording capacity which is doubled in comparison with that of any conventional optical recording medium using a single kind of organic compound.

As a typical embodiment of the combination of organic compounds A and B, it is suggested to use thioindigo (having a wavelength $\lambda 1$ of about 490 nm and a wavelength $\lambda 2$ of about 540 nm) and pyrene thioindigo (having a wavelength $\lambda 3$ of about 580 nm and a wavelength $\lambda 4$ of about 720 nm). However, a wide variety of other combinations of organic compounds A and B may also be used, which have different wavelengths of beams when exhibiting the photochromic phenomenon.

The above embodiment uses two kinds of organic compounds dispersed in the binder. However, the embodiment also allows the combination of three or more kinds of organic compounds provided that multiplex recording can be executed based on the principle mentioned above.

As mentioned above, an optical recording medium is encompassed by the present invention by which information is recorded, read, and erased with respect to a recording medium by applying beams projected from a light source capable of varying wavelength, wherein the recording medium comprises at least two kinds of organic compounds individually presenting a photochromic phenomenon being dispersed in a binder.

The aforementioned optical recording medium may include a substrate made of glass or plastic or the like material and a recording medium formed on the substrate.

The optical recording medium mentioned above may include at least two kinds of organic compounds such as hydrazone, osazone, stilbene, salicylaldehyde, spiropyrane, fulgide, azobenzene, and derivatives of these, being dispersed in the binder.

The above optical recording medium may include thioindigo and pyrene thioindigo being dispersed in the binder.

The binder mentioned above may maintain at least two kinds of organic compounds in a dispersed condition and may include an optically transparent material.

The above binder may be made of acrylic polymer, or polyvinyl chloride polymer, or an inorganic compound such as water glass.

The organic compound mentioned above may have a color which is reversibly variable by a projection of beam from a light source which is capable of projecting beams having different wavelengths.

The above organic compound may have an absorption spectrum which is reversibly and significantly variable by a projection of beams from the light source which is capable of projecting beams having different wavelengths.

The substrate mentioned above may comprise geometric pattern such as grooves etc. on the surface thereof.

The above recording medium may be formed with a reflection film on the top surface thereof.

The above recording medium may comprise protective films by which the recording medium is disposed therebetween, whereby the recording medium can be protected from high temperature and humidity.

A method of recording, reading, and erasing information to the optical recording medium mentioned above comprises the steps of:

an initial step for producing the first absorption spectrum by projection of beams having such a wavelength corresponding to a point close to the peak of the second, absorption spectrum of the organic compounds, each exhibiting a photochromic phenomenon, in which the first and second absorption spectra reversibly vary by exposure to the projection of beams having different wavelengths;

a recording step for recording information in the recording medium by projection of the recording beams having a wavelength corresponding to a point close to the peak of the first absorption spectrum of the recording medium;

a reading step for reading information from the recording medium by the detection of the difference in absorbance between the absorption spectra before and after recording with recording beams by projecting beams having such a wavelength corresponding to a point close to the recording beam and a lower intensity than that of the recording beams; and an erasing step for erasing the recorded information by projecting a beam having such a wavelength corresponding to a point close to the peak of the second absorption spectrum onto the recording medium, followed by varying the second absorption spectrum of the recorded portion into the first absorption spectrum so that the condition of the recording medium is in an initial state.

By virtue of those features mentioned above, making use of a photochromic phenomenon, recording, reading, and erasure of information can be executed independently to the individual organic compounds dispersed in the recording medium. As a result, the optical recording medium according to the present invention significantly promotes information recording density in proportion to the number of kinds of organic compounds used.

What is claimed is:

1. An optical recording medium by which information is recorded, read, and erased with respect to a recording medium layer by changing optical characteristics thereof through beams applied from a light source capable of varying wavelength, comprising:
    a transparent substrate; and
    a recording medium having only one layer, formed on the transparent substrate,
    wherein the recording medium layer includes at least two kinds of photochromic organic compounds which are supported in an optically transparent binder in a dispersed condition, the photochromic organic compounds having optical characteristics which are changeable by respectively different wavelengths, and the optically transparent binder being an organic polymer or an inorganic glass compound.

2. An optical recording medium according to claim 1, wherein the substrate is made of glass or plastic.

3. An optical recording medium according to claim 2, wherein the substrate includes a geometric pattern of grooves on the surface thereof.

4. An optical recording medium according to claim 2, wherein a reflection film is formed on the outer surface of the recording medium layer.

5. An optical recording medium according to claim 2 which further comprises a first protective disposed between the recording medium layer and the substrate, and a second protective layer disposed on the outer surface of the recording medium so as to protect the recording medium layer from high temperature and humidity.

6. An optical recording medium according to claim 1, wherein the photochromic organic compounds are selected from the group consisting of hydrazone, osazone, stilbene, salicylaldehyde, spiropyrane, fulgide, and azobenzene.

7. An optical recording medium according to claim 1, wherein the photochromic organic compounds are thioindigo and pyrene thioindigo.

8. An optical recording medium according to claim 1, wherein the binder is selected from the group consisting of acrylic polymer, polyvinyl chloride polymer and water glass.

9. An optical recording medium according to claim 1, wherein a color of the photochromic organic compounds is reversibly variable depending upon the wavelength of the beam of light projected from the light source.

10. An optical recording medium according to claim 1, wherein the photochromic organic compounds are selected from the group consisting of hydrazones, osazones, stilbenes, salicylaldehydes, spiropyranes, fulgides, and azobenzenes.

11. An optical recording medium according to claim 1, wherein the photochromic organic compounds are selected from the group consisting of hydrazones, osazones and stilbenes.

12. A method of recording, reading, and erasing information with respect to an optical recording medium comprises the steps of:
    providing an optical recording medium by which information is recorded, read, and erased with respect to a recording medium layer by changing optical characteristics thereof through beams applied from a light source capable of varying wavelength, comprising:
    a transparent substrate; and a recording medium having only one layer, formed on the transparent substrate, wherein the recording medium layer includes at least two kinds of photochromic organic compounds which are supported in an optically transparent binder in a dispersed condition, the photochromic organic compounds having optical characteristics which are changeable by respectively different wavelengths;

projecting beams having a first wavelength corresponding to a point close to the peak of a first absorption spectrum of a first photochromic organic compound onto said recording medium in an initial state so that said first organic compound changes color and exhibits a second absorption spectrum;

recording information in said recording medium by projection of recording beams having a wavelength corresponding to a point close to the peak of said second absorption spectrum onto said recording medium;

reading information from said recording medium by detecting the difference in absorbance between the absorption spectra before and after recording with said recording beams by projecting beams having a wavelength corresponding to a point close to said recording beams and an intensity lower than tat of said recording beams; and erasing said recorded information by projecting beams having a wavelength corresponding to a point close to the peak of said first absorption spectrum onto said recording medium, followed by varying said first absorption spectrum of the recorded portion of said recording medium into said second absorption spectrum so that the condition of said recording medium is in an initial state.

13. An optical recording medium which comprises a substrate and a recording medium formed thereon said recording medium comprising at least two different organic compounds each exhibiting photochromic properties and being dispersed in a binder, wherein each of said organic compounds has an absorption spectrum optically distinguishable from that of the other organic compounds such that the color of each organic compound varies depending upon the wavelength of an optical beam projected on said organic compound, and wherein information is recorded, read and erased with respect to said recording medium by projecting beams thereon from a light source capable of varying the beam wavelength.

14. An optical recording medium according to claim 13, wherein the substrate is made of glass or plastic.

15. An optical recording medium according to claim 13, wherein the photochromic organic compounds are selected from the group consisting of hydrazone, osazone, stilbene, salicylaldehyde, spiropyrane, fulgide, and azobenzene.

16. An optical recording medium according to claim 13, wherein the photochromic organic compounds are selected from the group consisting of hydrazones, osazones, stilbenes, salicylaldehydes, spiropyranes, fulgides, and azobenzenes.

17. An optical recording medium according to claim 13, wherein the photochromic organic compounds are selected from the group consisting of hydrazones, osazones and stilbenes.

18. A method of recording, reading, and erasing information with respect to an optical recording medium which comprises the steps of:

providing an optical recording medium which comprises a substrate and a recording medium formed thereon said recording medium comprising at least two different organic compounds each exhibiting photochromic properties and being dispersed in a binder, wherein each of said organic compounds has an absorption spectrum optically distinguishable from that of the other organic compounds such that the color of each organic compound varies depending upon the wavelength of an optical beam projected on said organic compound, and wherein information is recorded, read and erased with respect to said recording medium by projecting beams thereon from a light source capable of varying the beam wavelength;

projecting beams having a first wavelength corresponding to a point close to the peak of a first absorption spectrum of a first photochromic organic compound onto said recording medium in an initial state so that said first organic compound changes color and exhibits a second absorption spectrum;

recording information in said recording medium by projection of recording beams having a wavelength corresponding to a point close to the peak of said second absorption spectrum onto said recording medium;

reading information from said recording medium by detecting the difference in absorbance between the absorption spectra before and after recording with said recording beams by projecting beams having a wavelength corresponding to a point close to said recording beams and an intensity lower than that of said recording beams; and erasing said recorded information by projecting beams having a wavelength corresponding to a point close to the peak of said first absorption spectrum onto said recording medium, followed by varying said first absorption spectrum of the recorded portion of said recording medium into said second absorption spectrum so that the condition of said recording medium is in an initial state.

* * * * *